United States Patent
Mogar et al.

(10) Patent No.: US 8,272,806 B2
(45) Date of Patent: Sep. 25, 2012

(54) PANEL CONNECTOR

(75) Inventors: Joseph M. Mogar, Las Vegas, NV (US); Todd N. Miller, Henderson, NV (US)

(73) Assignee: Ford Contracting, Inc., Las Vegas, NV (US)

( * ) Notice: Subject to any disclaimer, the term of this patent is extended or adjusted under 35 U.S.C. 154(b) by 106 days.

(21) Appl. No.: 12/018,020

(22) Filed: Jan. 22, 2008

(65) Prior Publication Data

US 2009/0185855 A1     Jul. 23, 2009

(51) Int. Cl.
*F16B 5/02* (2006.01)

(52) U.S. Cl. ............. 403/388; 403/403; 52/19; 52/174; 52/184

(58) Field of Classification Search .............. 403/14, 403/16, 71, 149, 154, 158, 162, 384, 386, 403/388, 389, 403, 408.1; 52/235, 713, 19, 52/20, 174, 184
See application file for complete search history.

(56) References Cited

U.S. PATENT DOCUMENTS

| | | | |
|---|---|---|---|
| 3,375,545 A * | 4/1968 | Lipking | 16/288 |
| 3,434,714 A * | 3/1969 | Lanman | 472/109 |
| 3,559,355 A | 2/1971 | Day, Jr. | |
| 3,605,638 A * | 9/1971 | James | 410/49 |
| 4,081,936 A | 4/1978 | Wise | |
| 4,523,413 A * | 6/1985 | Koppenberg | 52/139 |
| 4,694,621 A | 9/1987 | Locke | |
| 5,619,834 A * | 4/1997 | Chen | 52/509 |
| 5,720,571 A * | 2/1998 | Frobosilo et al. | 403/403 |
| 5,816,008 A * | 10/1998 | Hohmann | 52/565 |
| 5,913,499 A * | 6/1999 | Kiggins | 248/200 |
| 5,947,431 A * | 9/1999 | Kiggins | 248/200 |
| 5,956,910 A * | 9/1999 | Sommerstein et al. | 52/235 |
| 6,033,145 A * | 3/2000 | Xu et al. | 403/256 |
| 6,061,989 A * | 5/2000 | Trivedi et al. | 52/633 |
| 6,298,617 B1 | 10/2001 | de Quesada | |
| 6,609,339 B1 * | 8/2003 | Pardue | 52/235 |
| 6,612,087 B2 * | 9/2003 | diGirolamo et al. | 52/712 |
| 6,910,243 B1 * | 6/2005 | Zimmer | 15/250.31 |
| 7,028,435 B2 | 4/2006 | Walker et al. | |
| 7,101,110 B2 * | 9/2006 | LaPointe | 403/365 |
| 7,104,024 B1 * | 9/2006 | diGirolamo et al. | 52/710 |

* cited by examiner

*Primary Examiner* — Daniel P. Stodola
*Assistant Examiner* — Nahid Amiri
(74) *Attorney, Agent, or Firm* — Greenberg Traurig

(57) ABSTRACT

Described is a building connecting apparatus for receiving structural members including frames and panels. The apparatus includes a main body having a central opening for receiving an extension member attached to a slot plate. Receiving plates can be coupled to the apparatus for receiving the structural members with the extension member capable of guiding and aligning the structural members.

1 Claim, 10 Drawing Sheets

PANEL CONNECTOR

FIELD OF THE INVENTION

The embodiments of the present invention relate to connectors, more specifically, to a panel connector for coupling building structural members.

BACKGROUND

Structural frameworks employing wooden or metal frame components are used extensively in the construction industry. In high-rise buildings, tolerances are strict for these framing components because each story depends upon the shape and position of the various portions of the immediately preceding story. In coupling these building structural members, field measurements may have to be taken thereby delaying the construction process. Furthermore, adjustments or modifications may have to be designed into the system for the skeleton of a building.

As such, there exists a need for a connector having adjustable elements capable of accommodating dimensional errors in coupling building structural members.

SUMMARY

Accordingly, a first embodiment of the present invention discloses a connector comprising: a clip having a central opening; a connector plate coupled to said clip, said connector plate including an extension member adaptable to be received by said central opening; and an upper plate coupled to said connector plate, said upper plate configured to provide a recess for receiving a first structural member. The clip can take on a C-, H-, L- or T-shaped configuration. A lower plate can be further coupled to said connector plate, said lower plate configured to provide a recess for receiving a second structural member. The first and second structural members include frames and sheet-like panels. One or more securing devices may be utilized for coupling said upper and lower plates. A securing means may be further utilized for fastening said upper plate to said clip, said securing means including soldering, welding and bonding material. The connector may incorporate an additional backing plate coupled to said connector plate, said backing plate having a slot for receiving said extension member.

A second embodiment of the present invention discloses a building connecting system comprising: first and second structural members; and a connector for coupling said first and second structural members, said connector comprising: a clip having a central opening; a connector plate coupled to said clip, said connector plate having an extension member operable to be received by said central opening; an upper plate coupled to said connector plate, said upper plate configured to provide a first channel for receiving said first structural member; and a lower plate coupled to said connector plate, said lower plate having a slot for receiving said extension member, and wherein said lower plate includes a second channel operable to receive said second structural member. As set forth above, the clip can take on a C-, H-, L- or T-shaped configuration. The first and second structural members include frames and sheet-like panels. The second structural member further includes slots adaptable to be received by said extension member. One or more securing devices may be utilized for coupling said upper and lower plates. The connector may incorporate an additional backing plate coupled to said connector plate, said backing plate having a slot for receiving said extension member.

A method claim of the present invention comprises: attaching one or more connectors to a side wall of a horizontally-positioned concrete slab, said one or more connectors comprise: a clip having a central opening; a connector pin coupled to said clip, said connector pin including an extension member adaptable to be received by said central opening; and an upper plate coupled to said connector pin, said upper plate configured to provide a recess for receiving a first structural member; and positioning a panel member such that said panel member rests within said recess of said upper plates of said one or more connectors.

Other variations, embodiments and features of the present invention will become evident from the following detailed description, drawings and claims.

DETAILED DESCRIPTION

It will be appreciated by those of ordinary skill in the art that the invention can be embodied in other specific forms without departing from the spirit or essential character thereof. The presently disclosed embodiments are therefore considered in all respects to be illustrative and not restrictive.

Figure 1:
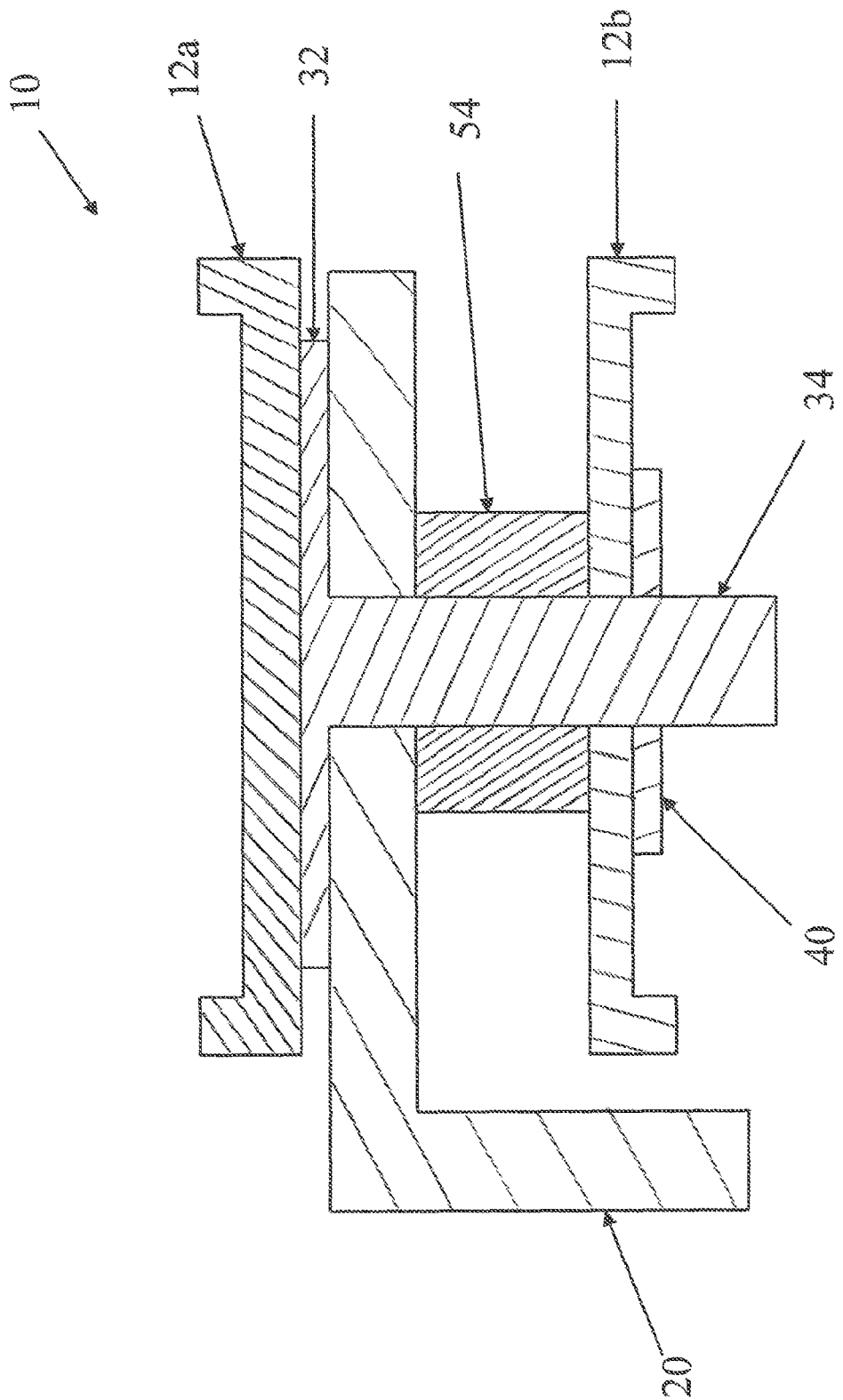
FIG. 1 illustrates a cross-sectional view of a panel connector according to a first embodiment of the presently disclosed invention.
Figure 7A:
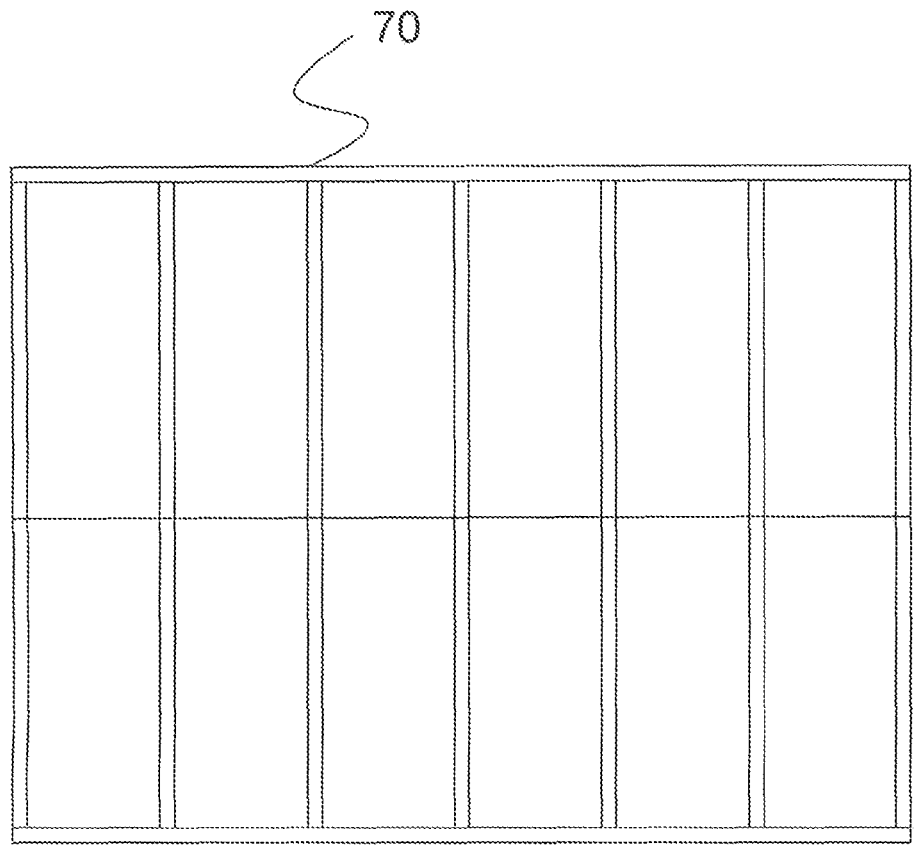
FIGS. 7A-7B illustrate cross-sectional and top-down views of building structural frames, respectively.
Figure 7B:
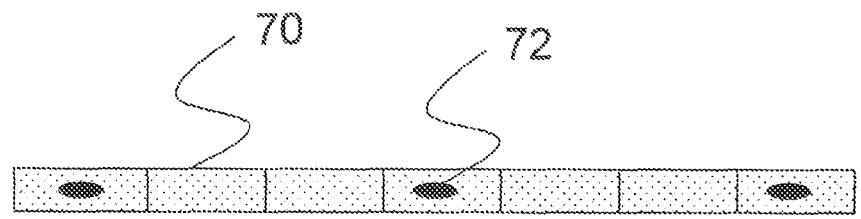

Initial reference is made to FIG. 1 illustrating a cross-sectional view of a panel connector 10 according to a first embodiment of the presently disclosed invention. The panel connector 10 includes a clip 20 coupled to a connector plate 30 and secured by a backing plate 40. The clip 20, connector plate 30 and backing plate 40 can be constructed of stainless steel, aluminum, steel or other suitable materials with similar characteristics including high strength and durability. In this embodiment, an upper receiving plate 12a is coupled to the connector plate 30 while a lower receiving plate 12b is coupled to the backing plate 40. Each receiving plate 12a, 12b includes a respective recess or channel for receiving a portion of a frame structure 70, as shown in FIGS. 7A-7B, for reasons which will become more apparent in subsequent figures and discussion.

Figures 2A, 2B:
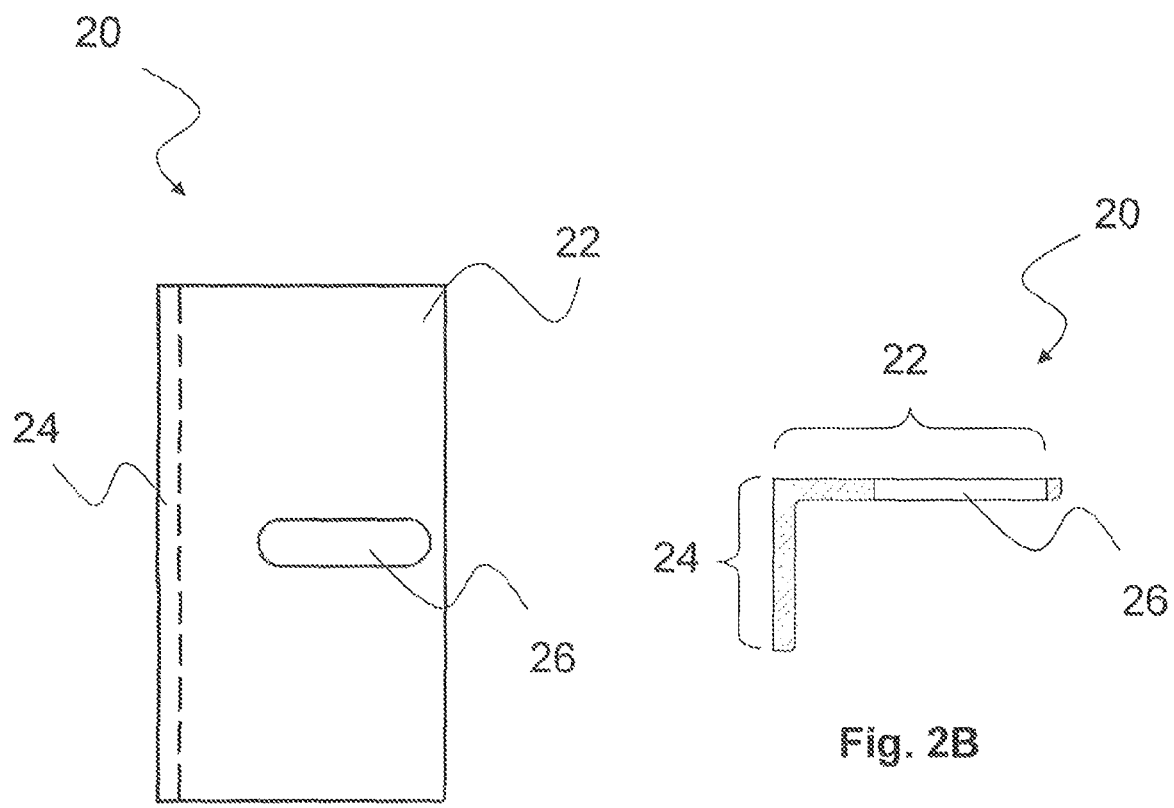
FIGS. 2A-2B illustrate top and cross-sectional views of a clip of the panel connector, respectively.
Figure 3A:
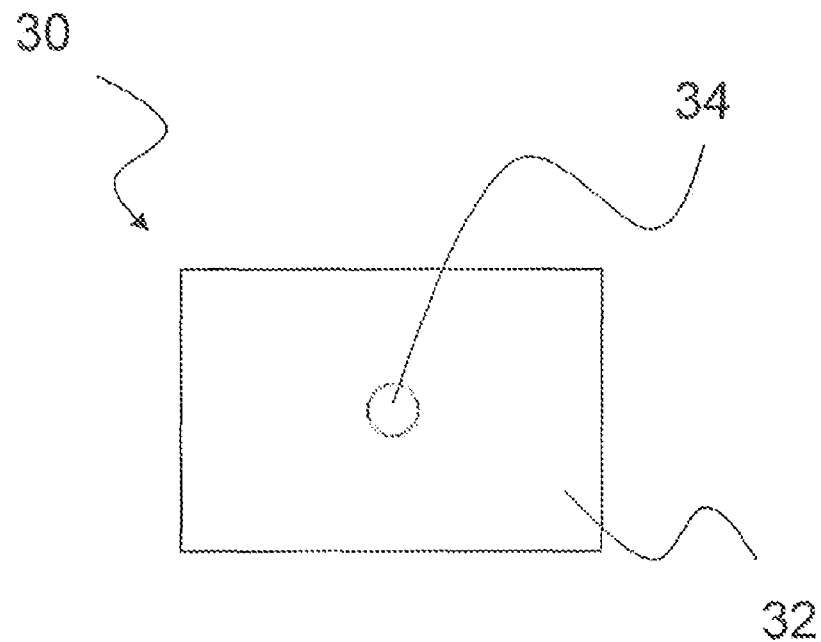
FIGS. 3A-3B illustrate top and cross-sectional views of a connector plate of the panel connector, respectively.
Figure 3B:
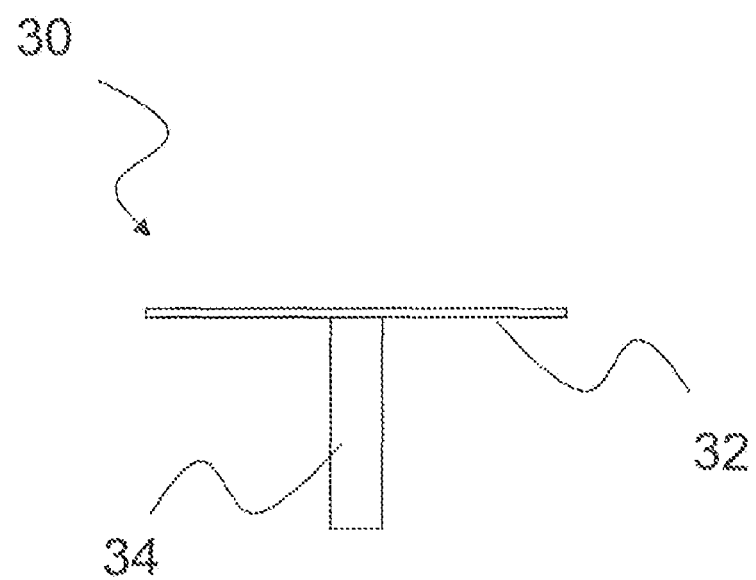
Figure 8:
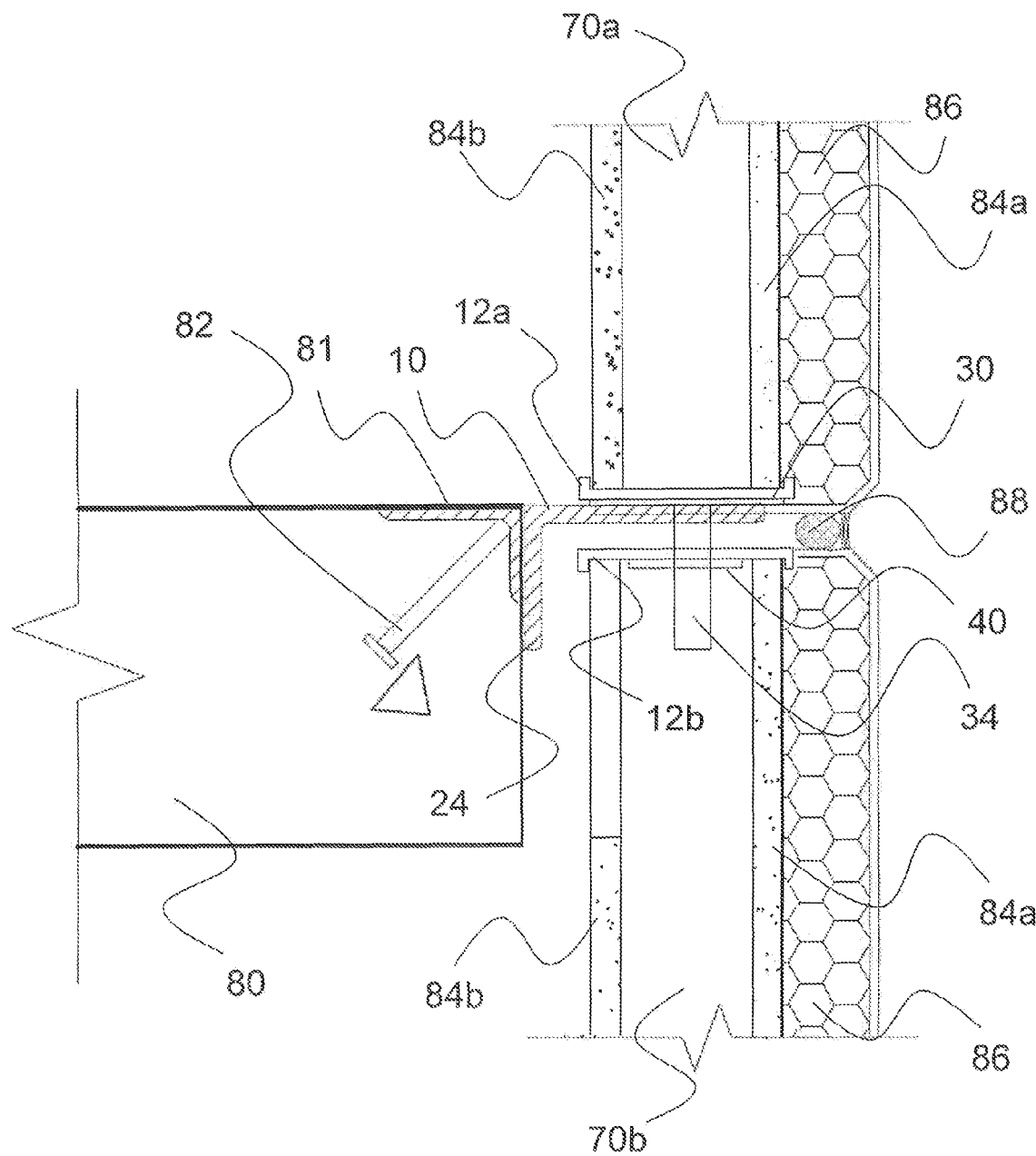
FIG. 8 illustrates a cross-sectional view of a building connecting system according to a second embodiment of the presently disclosed invention.

Reference is now made to FIGS. 2A-2B illustrating top and cross-sectional views of the clip 20, respectively. As shown, the clip 20 has a substantially L-shape with a horizontal portion 22 and a vertical portion 24. In one embodiment, the vertical portion 24 of the clip 20 can be secured to a concrete slab 80 using fastening means including soldering, welding or bonding as best shown in FIG. 8. Returning now to FIGS. 2A-2B, an aperture 26 is formed within the horizontal portion 22 for receiving a rod or extension member 34 of the connector plate 30, as shown in FIGS. 3A-3B, for reasons which will become more apparent in subsequent figures and discussion. Referring again to FIGS. 2A-2B, the aperture 26 can be formed by boring, milling, drilling and/or cutting. Although the clip 20 has been shown as a single, integrated unit, it will be understood that the clip 20 can be formed by coupling a flange or mounting plate 24 to a slot plate 22 using fastening means including screws, bolts and rivets. And although a substantially L-shaped clip 20 has been shown, the clip 20 can take on other configurations including C-, H- or T-shapes having additional horizontal 22 and/or vertical 24 sections. In other embodiments, the clip 20 can include straight or curved configurations.

Reference is now made to FIGS. 3A-3B illustrating top and cross-sectional views of the connector plate 30, respectively. As shown, the connector plate 30 includes a substantially rectangular-shaped plate 32 having a rod or an extension member 34 protruding from an underside of the plate 32. Although shown as a cylindrical tube, the extension member 34 can also take on other shapes and configurations including a threaded rod or tapered tube. In operation, the extension member 34 can be used to couple or guide a frame structure 70 as shown in FIG. 8. Although being substantially rectangular in shape, it is understood that the plate 32 can take on other polygonal shapes including ellipsoidal, circular and square. In one embodiment, the plate 32 and the extension member 34 are integrated as a single unit. In other embodiments, the plate 32 and the extension member 34 are coupled using securing means including soldering, welding and bonding. The plate 32 and the extension member 34 can also be coupled using fastening means including screws, rivets and bolts. In one embodiment, the extension member 34 can be received by the aperture 26 of the clip 20 with rigid dimensional specifications. In other embodiments, the aperture 26 of the clip 20 may be oversized to allow for adjustments and manipulations of the extension member 34 within the aperture 26. Once coupled, the connector plate 30 and the clip 20 may be attached to form part of the panel connector 10 using fastening or securing means previously discussed.

Figure 4:
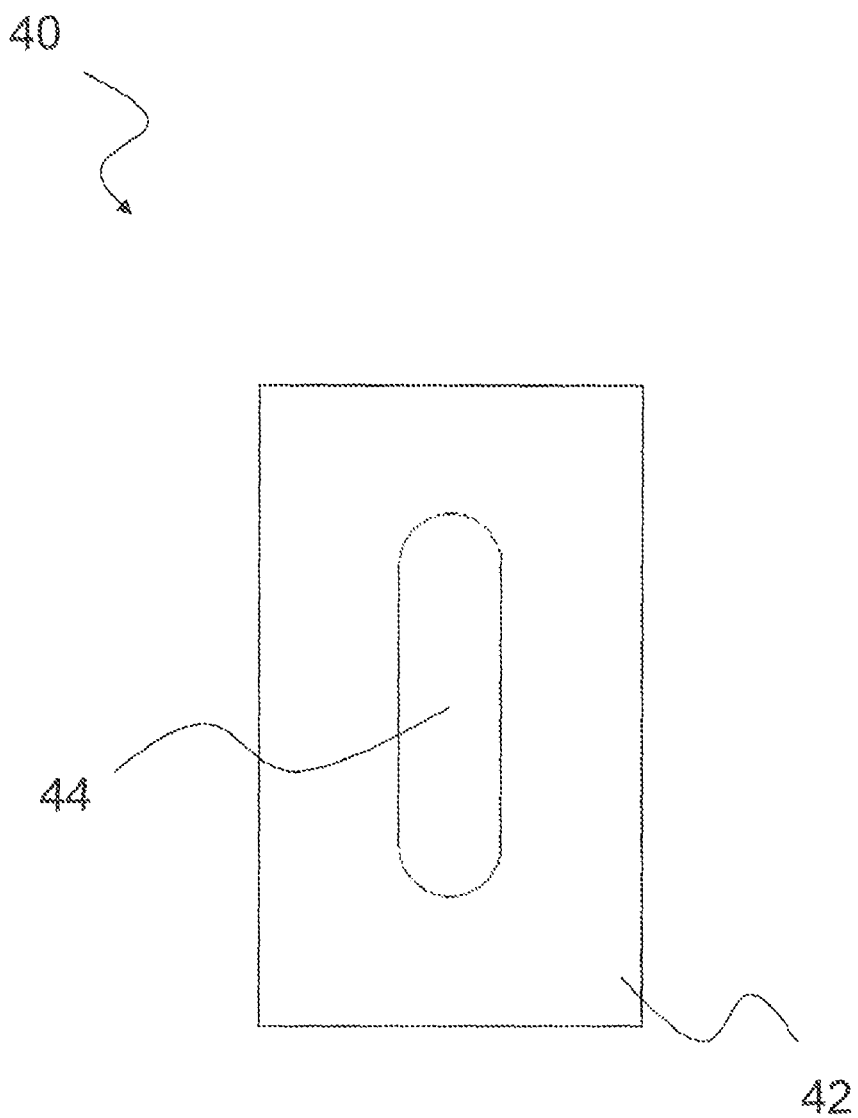
FIG. 4 illustrates a top view of a backing plate of the panel connector.

Reference is now made to FIG. 4 illustrating a top view of a securing or backing plate 40. Like the connector plate 30, the backing plate 40 includes a slot plate 42 with a central aperture 44 formed therein. Although rectangular in shape, it is understood that the slot plate 42 can take on other polygonal shapes including circular, ellipsoidal and square. Like the aperture 26 of the clip 20, the aperture 44 of the backing plate 40 can be sized to accommodate the extended rod 34 of the connector plate 30. In other embodiments, the aperture 44 may be oversized to allow for adjustments and manipulations of the extension member 34 while within the aperture 44. Although the backing plate 40 can be attached to an underside of the lower receiving plate 12b as shown in FIG. 1, it will be appreciated that the backing plate 40 can be coupled to an upper surface of the lower receiving plate 12b. Furthermore, two backing plates 40 may be incorporated.

Figure 5A:
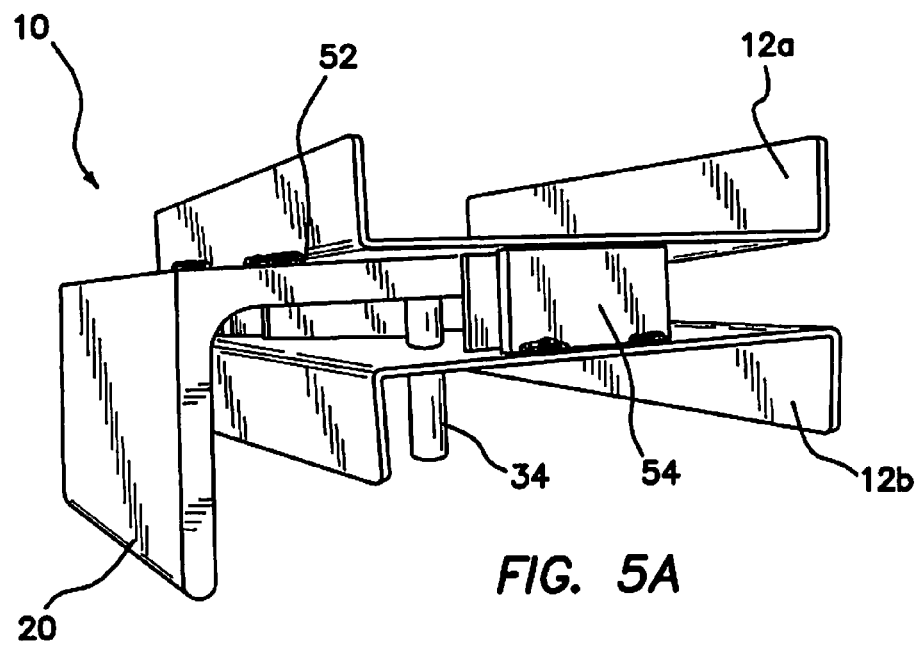
FIGS. 5A-5C show three different side views of the panel connector.
Figure 5B:
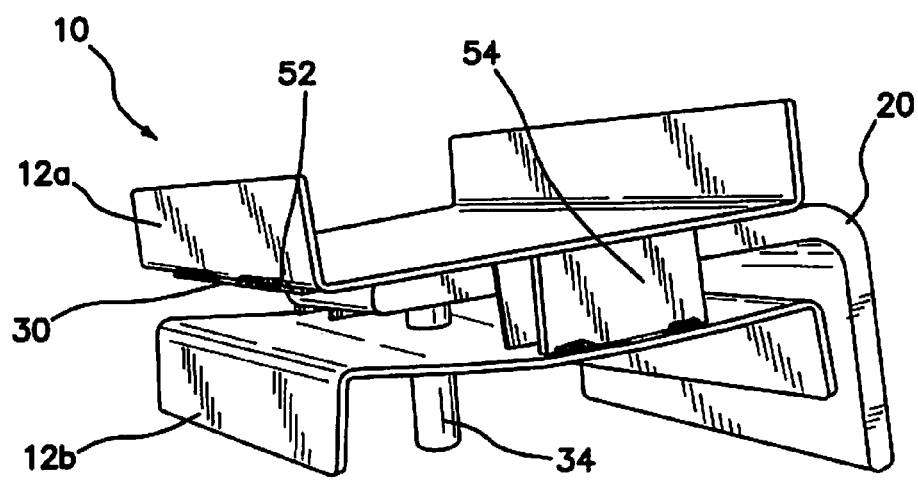
Figure 5C:
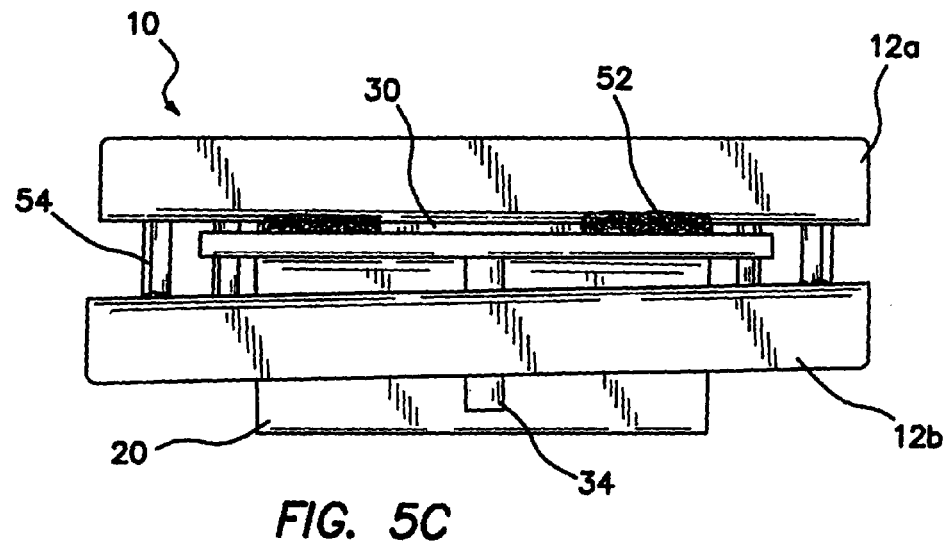

Reference is now made to FIGS. 5A-5C showing side views of the panel connector 10 as viewed from three different perspectives. As shown, the clip 20 can be coupled to the connector plate 30 (best shown in FIG. 5C) with the extension member 34 being received by the aperture 26 (hidden underneath). Because the aperture 26 can be oversized, adjustments may be made to the horizontal position of the clip 20 with respect to the connector plate 30 in order to accommodate framing members (not shown) of various shapes and sizes. An upper receiving plate 12a may be coupled to either the clip 20, the rectangular plate 32 (hidden underneath) of the connector plate 30 or both, using securing means 52 including suitable soldering, welding or bonding. Once coupled to form part of the connector plate 10, the upper receiving plate 12a provides a recess for receiving a structural framing member.

Near an underside of the panel connector 10 is a lower receiving plate 12b that can be coupled to the backing plate 40 (hidden underneath). Like the aperture 26 of the clip 20, the aperture 44 of the backing plate 40 allows for the necessary horizontal placement and adjustment of the clip 20, connector plate 30 and backing plate 40 as necessary. The backing plate 40 serves to further secure and strengthen the panel connector 10 while in operation. And like the upper receiving plate 12a, once coupled, the lower receiving plate 12b is capable of providing a recess for receiving another structural framing member. In addition, the rod 34 is capable of extending from an underside of the panel connector 10 to further guide and align the structural framing member. This will become more apparent in subsequent figures and discussion.

Further, one or more securing devices 54 may be incorporated to provide additional structural strength to the panel connector 10, the securing devices 54 capable of coupling the upper and lower receiving plates 12a, 12b. In this embodiment, the securing devices 54 are rectangular box-like structures fabricated of stainless steel and soldered or welded onto the receiving plates 12a, 12b. In other instances, securing devices 54 fabricated of aluminum, steel or other suitable materials with various shapes and sizes may be utilized for securing the receiving plates 12a, 12b.

Figure 6:
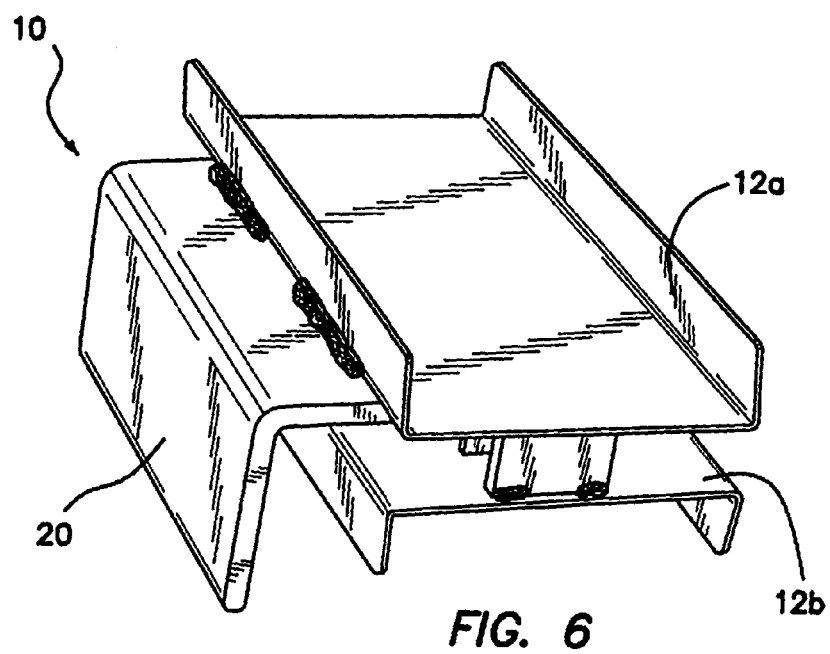
FIG. 6 shows a perspective view of the panel connector.

Reference is now made to FIG. 6 illustrating a perspective view of the panel connector 10. As shown, the receiving plates 12a, 12b are configured to receive building structural members 70, while the clip 20 is attached to a concrete slab 80 or other parts of a building as best illustrated in FIG. 8.

Reference is now made to FIGS. 7A-7B illustrating side and top views of a building structural member 70 including the likes of wooden frames, metal frames, concrete frames and other rigid sheet-like and wall-like panels for construction purposes. As shown, the structural member 70 has a rectangular outline with repeating units spaced apart at a pre-determined distance. The metal frame 70 can be pre-fabricated or assembled on site, and be constructed of stainless steel, aluminum, metal alloy, wood, concrete or other suitable material. In some instances, the top of the structural member 70 includes openings or apertures 72 for orientation or alignment purposes.

Reference is now made to FIG. 8 illustrating a cross-sectional view of the panel connector 10 integrated between floors of a building. As shown, the panel connector 10 is coupled to a portion of a concrete slab 80 using fastening means previously described. In one embodiment, the panel connector 10 is welded to a metal member 81 formed on a corner of the concrete slab 80. An embedded rod 82 further supports the metal member 81 formed in the concrete slab 80. Other means including bonding may be used to attach the panel connector 10 to the concrete slab 80.

Each floor includes a respective building frame member 70a, 70b with corresponding exterior 84a and interior 84b sheathing. Sheet Rock® and other insulating panels may be incorporated within the interior sheathing 84b, while exterior insulation and finishing 86 including composite insulations and waterproofing panels may be integrated to the exterior sheathing 84a to provide exterior walls with a finished surface. In other instances, the walls need not have any interior or exterior finish 86. A caulk joint 88 can be incorporated between the floors to prevent leaks and provide additional insulation between the floors.

As shown in FIG. 8, the panel connector 10, as constructed and coupled, includes the clip 20, connector plate 30 having an extension member 34 secured by a backing plate 40 as best illustrated in the preceding figures. The upper and lower plates 12 can be attached to the panel connector 10 wherein each plate 12a, 12b is capable of providing a channel or recess for receiving a building structural member 70a, 70b. Referring again to FIG. 8, the upper plate 12a is capable of receiving an upper floor frame structure 70a while the lower plate 12b is capable of receiving a bottom floor frame structure 70b. Because of the aperture 26 within the clip 20, horizontal adjustments may be made to the connector plate 30 thereby affecting placement of the plates 12a, 12b and corresponding horizontal positioning of the frame structures 70a, 70b. Likewise, because of the aperture 44 of the backing plate 40, vertical adjustments may be made with respect to the connector pin 30 thereby affecting placement of the plates 12a, 12b and the corresponding vertical positioning of the frame structures 70a, 70b. In other words, depending on the position of the frame structures 70a, 70b with respect to the building floors, adjustments may be made to the panel connector 10 to ensure that the frame structures 70a, 70b are securely coupled from one floor to the next. Once a frame structure 70a, 70b has been received by the corresponding plate 12a, 12b, additional fastening or securing means as previously described may be utilized to further fasten or secure the structure 70 to the plate 12.

In one embodiment, the frame structures 70a, 70b include apertures 72 near the top of the frames as previously discussed and shown in FIGS. 7A-7B. In this instance, when coupled, the extension member 34 of the panel connector 10 is capable of guiding or aligning the frame structure 70b from a lower floor to further bring it into alignment with the frame structure 70a of an upper floor. In other embodiments, corresponding female threads (not shown) may be incorporated within the aperture 72 or other portions of the frame structure 70b to accommodate a threaded rod 34.

Figure 9A:
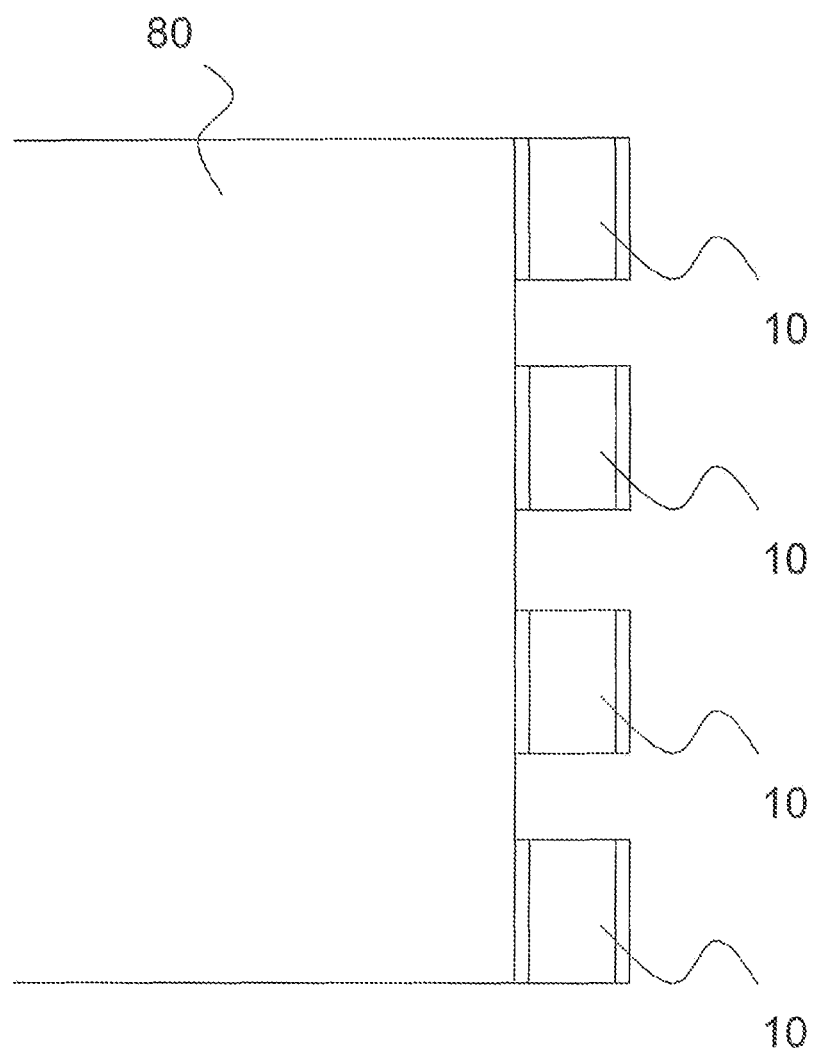
FIGS. 9A-9B illustrate upper views of the panel connector in operation as coupled to a concrete slab.
Figure 9B:
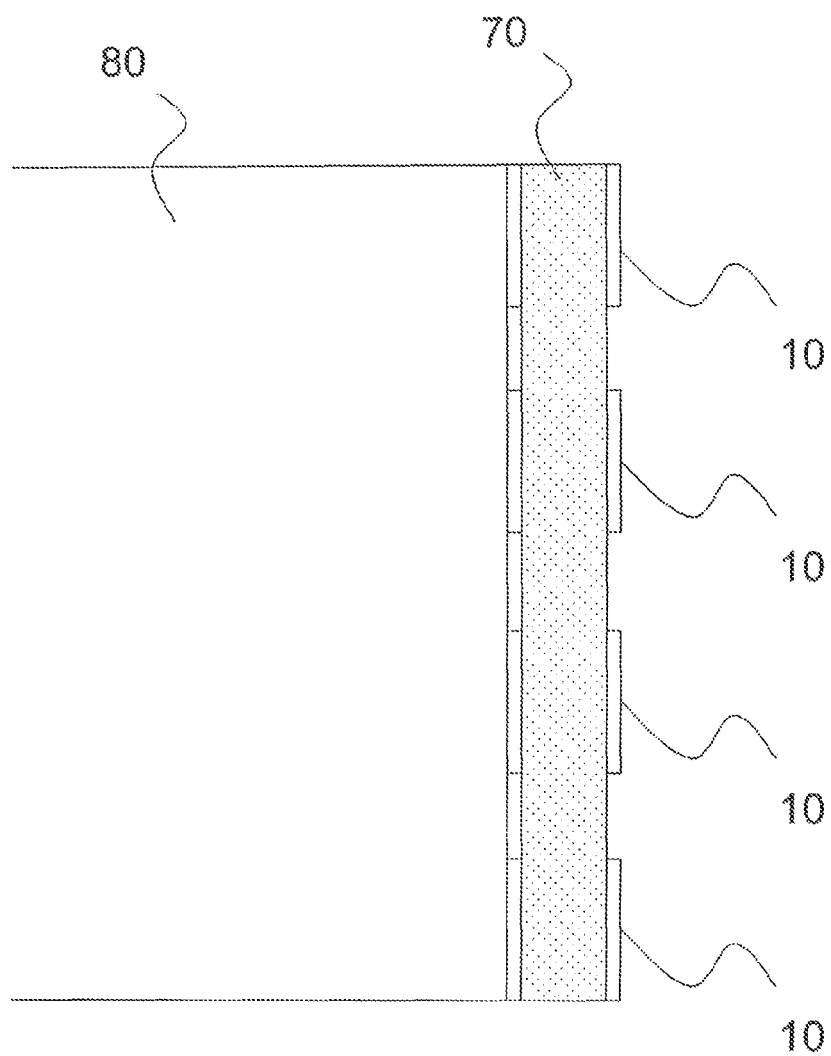

Reference is now made to FIGS. 9A-9B illustrating top views of a plurality of panel connectors 10 in operation as coupled to a concrete slab 80. As shown in FIG. 9A, multiple panel connectors 10 may be disposed along a length of the concrete slab 80 using fastening or securing means previously discussed. Once secured, a frame structure 70 may be situated on the panel connectors 10 as shown in FIG. 9B and secured using suitable fastening means. To secure a frame structure 70 from a floor below, the plurality of panel connectors 10 with multiple extension members 34 (hidden underneath) can be used to guide and bring the frame structure 70 into alignment. Once aligned, additional fastening or securing means may be utilized to secure the frame structure 70 to the panel connectors 10 as discussed above.

Although the invention has been described in detail with reference to several embodiments, additional variations and modifications exist within the scope and spirit of the invention as described and defined in the following claims.

What is claimed is:

1. A connector comprising:
a clip having a first leg and second leg with a central opening in said first leg;
a connector plate coupled flush to said first leg of said clip such that an integral connector plate extension member extends through said central opening in said clip;
an upper plate coupled to a surface of said connector plate, said upper plate defining an upward facing recess for receiving a first structural member of a building, said upper facing away from said connector plate; and
first and second securing devices disposed between and coupling said upper plate to a lower plate, said first securing device positioned proximate and between a first end of said upper plate and a first end of said lower plate and said second securing device positioned proximate and between a second end of said upper plate and a second end of said lower plate, said lower plate defining a downward facing recess, facing opposite said upward facing recess, for receiving a second structural member of a building, said extension member extending through said lower plate into said downwardly facing recess, said extension member configured to insert into said second structural member, said downward facing recess facing away from said connector plate.

* * * * *